(12) United States Patent
Milton et al.

(10) Patent No.: US 7,770,001 B2
(45) Date of Patent: Aug. 3, 2010

(54) PROCESS AND METHOD TO DISTRIBUTE SOFTWARE PRODUCT KEYS ELECTRONICALLY TO MANUFACTURING ENTITIES

(75) Inventors: Jeffrey J. Milton, Redmond, WA (US); Albert R. Buckingham, Bellevue, WA (US); Krishnakumar Sethuraman, Redmond, WA (US); Stephanie D. Herndon, Reno, NV (US)

(73) Assignee: Microsoft Corporation, Redmond, WA (US)

( * ) Notice: Subject to any disclaimer, the term of this patent is extended or adjusted under 35 U.S.C. 154(b) by 1084 days.

(21) Appl. No.: 11/095,038

(22) Filed: Mar. 30, 2005

(65) Prior Publication Data

US 2006/0230271 A1 Oct. 12, 2006

(51) Int. Cl.
*H04L 9/10* (2006.01)
(52) U.S. Cl. ...................................................... 713/156

(58) Field of Classification Search .................. 713/156, 713/162, 175; 380/278, 282
See application file for complete search history.

(56) References Cited

U.S. PATENT DOCUMENTS

| 6,169,976 | B1* | 1/2001 | Colosso ........................ 705/59 |
| 6,557,105 | B1* | 4/2003 | Tardo et al. .................. 713/193 |
| 2001/0051996 | A1* | 12/2001 | Cooper et al. ............... 709/217 |
| 2004/0030887 | A1* | 2/2004 | Harrisville-Wolff et al. . 713/155 |

* cited by examiner

*Primary Examiner*—Ellen Tran
(74) *Attorney, Agent, or Firm*—Shook, Hardy & Bacon LLP

(57) ABSTRACT

A method and system provide digital certificates of authentication for authenticating software installed on computer devices. The digital certificates of authentication authorized the use of software installed on computer devices by binding such a digital certificate to an attribute of the computer device. In one example, the digital certificate of authentication is bound to a motherboard serial number of a computer device. The method and system further provide a secure environment for transmitting one or more digital certificates of authentication.

20 Claims, 7 Drawing Sheets

PROCESS AND METHOD TO DISTRIBUTE SOFTWARE PRODUCT KEYS ELECTRONICALLY TO MANUFACTURING ENTITIES

FIELD OF THE INVENTION

The present invention generally relates to licensing of software. More particularly, the present invention relates to the delivery of secure software license information, such as a digital key, for the purpose of licensing and allowing use of software.

BACKGROUND OF THE INVENTION

Software licensing has been used for some time in the software industry as a way of controlling use of software, and more particularly, for the purpose of limiting or eliminating unauthorized use of software. The unauthorized or unlicensed use of software is known as software piracy.

The resulting economic dislocation that occurs due to software piracy is severe. As the costs of developing and supporting software programs increase, the need to reduce piracy grows. One of the key elements of reducing software piracy is the use of so called authentication keys, which may be used by an authorized user or entity to enable a software program to operate. An authentication key includes software enabling information in a form that is understood by the software program, and ensures that a user or entity understands and agrees to the license terms of the software program.

License terms are the terms that apply to the use of the particular copy of the software program, and can include a start date, an end date, a number of program launches, fingerprint information to limit use on a specific local area network or a specific machine, and other controlling information. Once the authentication key is correctly entered in the software program, these types of license terms often become binding and thereby dictate the use of the software program.

The runtime environment of most software programs, including many major operating systems, makes it difficult to effectively protect a software program from unauthorized use or reproduction. Software developers have attempted to increase the difficulty of bypassing electronic licenses that dictate the functionality of software programs. However, this approach tends to inconvenience a user of software programs, and/or the developer of software programs.

Currently, authenticating software programs generally requires a "challenge/response" mechanism. The challenge/response mechanism requires a user or entity to input a series of alphanumeric characters, also known as an authentication key that is designed to activate and allow the use of a particular software program. Authentication keys are often included with the packaging associated with a software program. In the case of hardware manufacturers and other large scale entities that install massive numbers of software products on systems that are sold in commerce, the process of "activating" software programs using authentication keys is often a time-consuming process.

Accordingly, there remains a need for a system and method for delivery of authentication keys, or another software enabling device/mechanism, in a secure yet simplified manner. Of particular importance is the need to provide larger entities, such as manufacturers of hardware devices that include preinstalled software programs on these devices, the ability to easily authenticate preinstalled software programs in a time-saving and cost-effective manner.

SUMMARY OF THE INVENTION

The present invention substantially overcomes the time wasting process of requiring users to manually enter a series of alphanumeric characters (an authentication key) to enable software preinstalled a computerized device. Moreover, the present invention substantially improves the current mechanism that hardware manufactures use for authenticating software programs installed on systems sold in commerce. The foregoing is achieved by providing a secure and trusted method and system for delivering encrypted software product keys to hardware manufactures and the like. The hardware manufactures are in possession of a decryption key for decrypting the encrypted software keys, and use the decrypted software keys to enable preinstalled programs on manufactured devices. Advantageously, the software keys enable the use of the preinstalled programs and also bind the preinstalled programs with the hardware the programs reside upon. Therefore, protection against software piracy is substantially curtailed, and the process of enabling software is improved.

At least one exemplary embodiment of the present invention provides a method for providing at least one digital certificate of authentication, the at least one digital certificate of authentication for authenticating software installed on a device, wherein authenticating includes associating the at least one digital certificate with an attribute of the device that includes the software installed thereon.

Another exemplary embodiment provides a method for receiving an order requesting a digital certificate of authentication; generating a digital certificate of authentication, the digital certificate of authentication being encrypted with an encryption key; and preparing the encrypted digital certificate of authentication for transmission over a transmission medium.

Yet another exemplary embodiment of the present invention provides a system including an order receiving device for receiving orders requesting one or more digital certificates of authentication; and a digital certificate of authentication generating device, the generating device for generating digital certificates of authentication, wherein generated digital certificates of authentication are encrypted with an encryption key and bundled in a manner that allows communication thereof over a transmission medium

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENTS

The herein described exemplary embodiments of the present invention relate to a method and system for delivering at least one digital key, also referred to as a digital certificate of authenticity (DCOA), to enable entities to authorize the use of a software product. The DCOAs described and discussed herein do not relate to a current standardization system (e.g. ANSI). Various modifications to the exemplary embodiments and the generic principles and features described herein will be readily apparent to those skilled in the art. Thus, it is to be understood the present invention is not intended to be limited to the embodiments illustrated and discussed herein, but is to be accorded the wider scope consistent with the described principles and features.

Figure 1:
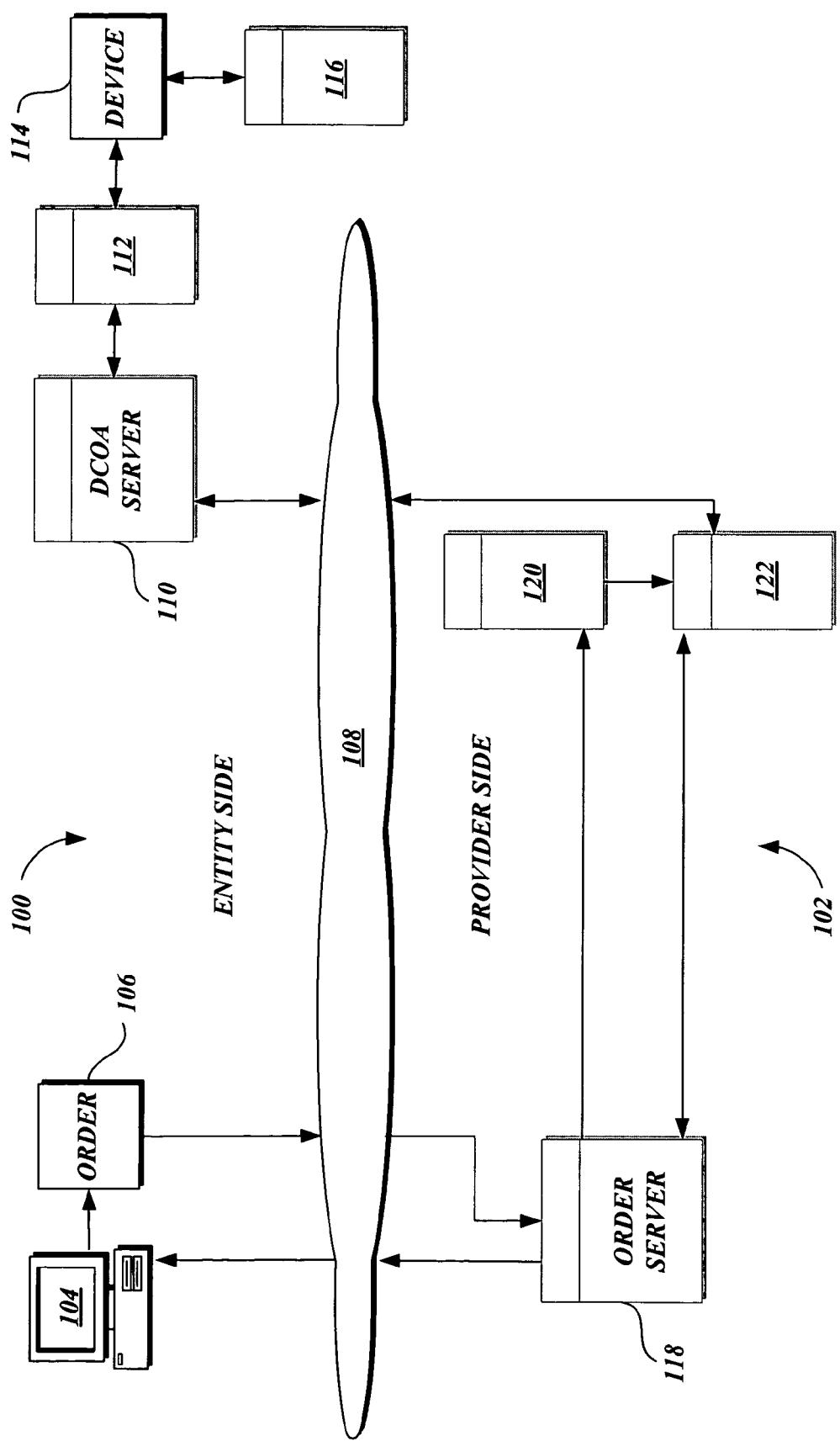
FIG. 1 illustrates a system architecture suitable for implementing an exemplary embodiment of the present invention.

FIG. 1 illustrates a system architecture suitable for implementing an exemplary embodiment of the present invention. The illustrated system architecture includes an entity side 100, such as a computer manufacturer or similar entity that manufactures devices that include software products, and a provider side 102, such as a software manufacturer or software provider.

The elements of the entity side 100 include a computer system 104 that is designed to produce one or more orders 106 generated by a user of the computer system 104. The order 106 may be communicated to the provider side 102 via a network 108, such as the Internet, a local area network (LAN), a wide area network (WAN), or the like. The entity side 100 further includes a DCOA server 110 that is coupled to the network 108. The DCOA server 110 is further coupled to a secure server 112, described in detail below. The secure server 112 is coupled to a device 114 that has been identified by the entity side 100 as requiring loading of one or more software programs. The actual software programs, also known as program images, are obtained from an image server 116 also located on the entity side 100.

The provider side 102 includes an order server 118 that is in communication with the network 108. The order server is at least capable of receiving one or more orders 106 from the computer system 104 of the entity side 100. The order server is further in communication with a DCOA generating server 120. The DCOA generating server 120 is coupled to a DCOA distribution server 122. As is illustrated in FIG. 1, the DCOA distribution server 122 of the provider side 102 is capable of communicating with the DCOA server 110 of the entity side 100 via the network 108.

The foregoing discussion of the elements on the entity side 100 and on the provider side 102 is provided as a broad overview of one exemplary example of a system architecture suitable for implementing exemplary embodiments of the present invention. Clearly, the system architecture illustrated in FIG. 1 may be modified based upon the requirements of the entity side 100 and/or the capabilities of the provider side 102. For example, depending upon the manufacturing capabilities of the entity side 100, each of the elements of the entity side 100 may be integrated into one device that is capable of serving devices 114 that require the loading of software programs and the authentication of the loaded software using one or more DCOAs. Similarly, the size of the entity side 100 may dictate the DCOA distribution capability of the provider side 102. This may require a plurality of order servers, such as the order server 118 illustrated in FIG. 1, and/or additional DCOA generating servers, such as the DCOA generating server 120, and additional DCOA distribution servers, such as the DCOA distribution server 122.

Although various elements of the entity side 100 and the provider side 102 are shown as being directly connected to one another, this is by way of example only. For example, the respective elements of the entity side 100 and the provider side 102 may be connected by way of a network that is similar to the network 108. For simplicity, this type of connection of the various elements has not been illustrated in FIG. 1. However, it is to be understood that both the entity side 100 and the provider side 102 are capable of implementing the interconnection of various elements in a variety of manners.

The DCOA generating server 120 is preferably a secure server controlled by a key authority. Preferably, the DCOAs handled and/or produced by the DCOA generating server 120 are protected by way of a trust-based system that incorporates the use of public/private encryption keys. The public/private encryption keys allow secure communications and delivery of tamper-proof DCOAs. A private key is used to encrypt, and a public key is used to decrypt, or vice-versa. The public and private keys are mathematically related, but one cannot be derived from the other. Thus, if something is encrypted with a public key, typically widely available, only the owner of the private key can decrypt. Alternatively, if the private key owner encrypts with the private key, anyone with the associated public key can decrypt, with the knowledge that the private key owner is the originator of the encrypted data. It is critical for security that the private keys remain private and in control of the key owner.

Preferably, the DCOA generating server 120 uses a public key to secure the DCOAs generated and/or transferred the DCOA generating server 120. Therefore, if an entity that receives DCOAs delivered by the DCOA generating server 120 has possession of the private key associated with the public key used to secure the delivered DCOAs, that entity will be able to access and use the secured DCOAs.

The secure server 112 of the entity side 100 is capable of receiving secured DCOAs from the provider side 102. In particular, when secured DCOAs are delivered by the DCOA server 110, the secure server 112 uses a private key, which is associated with the public key used to secure the delivered DCOAs, to decrypt the secured DCOAs to thereby render them ready for use.

Although the DCOA generating server 120 of the provider side 102 is disclosed as using a public key to encrypt DCOAs, and the secure server 112 of the entity side 100 is disclosed as utilizing an associated private key to decrypt delivered DCOAs, this is by way of example only. In particular, an exemplary embodiment of the present invention may also implement the use of a private key at the DCOA generating server 120 and a public key that is used at the secure server 112. Moreover, although key-based encryption is discussed in conjunction with securing DCOAs generated by the DCOA generating server 120 and received by the secure server 112, other encryption techniques may also be used and, thus fall within the scope of the present invention.

Figure 2:
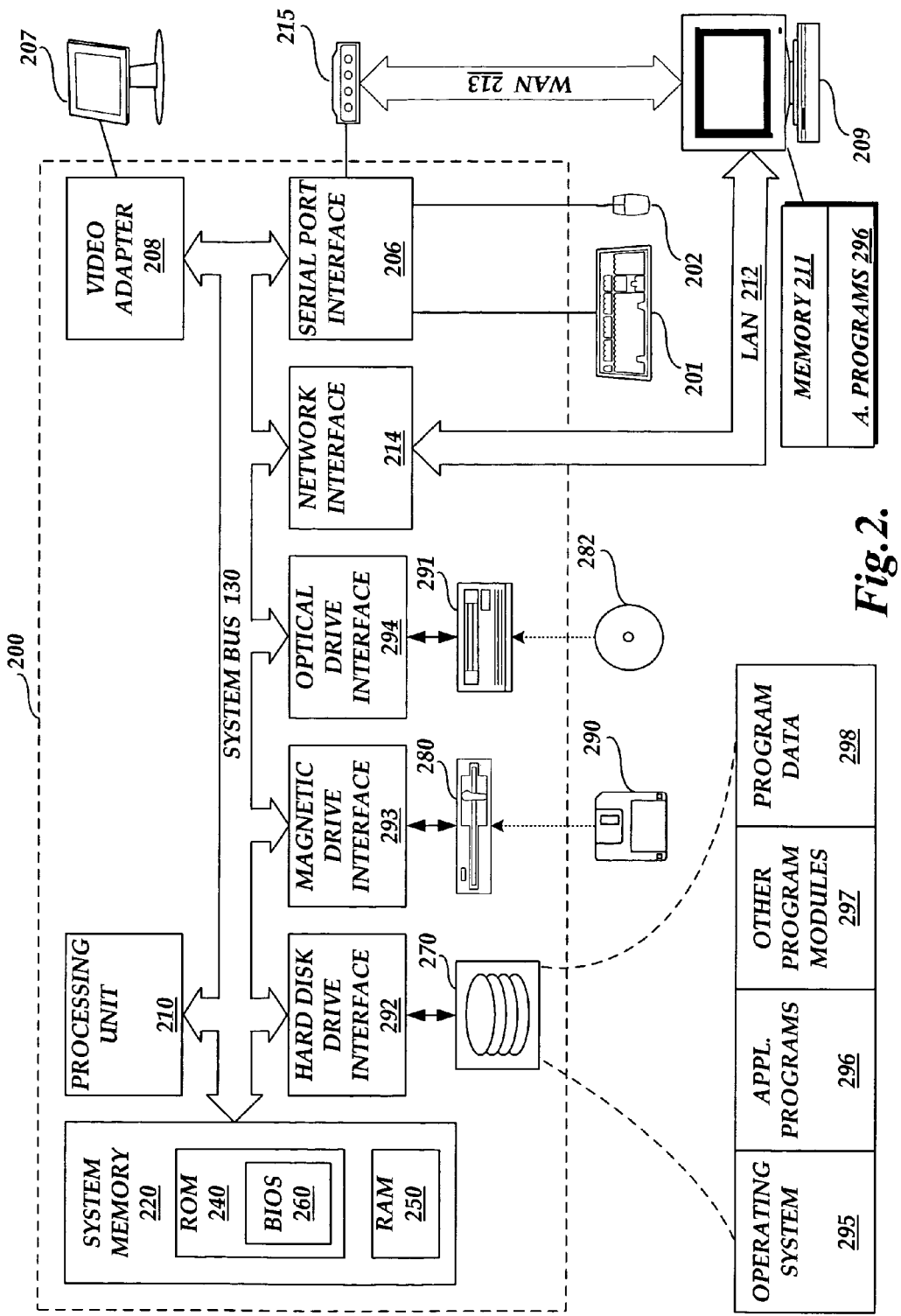
FIG. 2 is a schematic diagram of an exemplary general-purpose digital computing environment that can be used to implement various aspects of the present invention.

FIG. 2 is a schematic diagram of an exemplary general-purpose digital computing environment that can be used to implement various aspects of the present invention. The present invention may also be implemented in a number of simplified versions of a computer 200. For example without limitation, a number of hand-held computing devices, or a number of tablet PCs. The present invention may also be implemented in part of a microprocessor system, a microprocessor-based or programmable consumer electronic device, a network PC, a mini computer, a mainframe computer, hand-held devices, and the like. Hand-held devices include pocket- PC devices, devices implementing the Windows Mobile™ and Palm® Operating Systems, and other similar devices, such as wireless telephones, that implement condensed and/or simplified operating systems.

The computer 100 illustrated in FIG. 2 includes a processing unit 210, a system memory 220, and a system bus 230 that couples various system components including the system memory 220 to the processing unit 210. The system bus 230 may be any of several types of bus structures including a memory bus or memory controller, a peripheral bus, and a local bus using any of a variety of bus architectures. The system memory 220 includes a read-only memory (ROM) 240 and a random access memory (RAM) 250.

A basic input/output system (BIOS) 260, which is stored in the ROM 240, contains the basic routines that help to transfer information between elements within the computer 200, such as during startup. The computer 200 also includes a hard disk 270 for read and write operations, a magnetic disk drive 280 for reading from or writing to a removable magnetic disk 290, and an optical disk drive 291 for reading from or writing to a removable optical disk 282 such as a CD-ROM or other optical media. The hard disk drive 270, magnetic disk drive 280, and optical disk drive 291 are connected to the system bus 230 by a hard disk drive interface 292, a magnetic disk drive interface 293, and an optical disk drive interface 294, respectively. The drives and their associated computer readable media provide non-volatile storage for computer readable instructions, data structures, program modules and other data for the personal computer 200. It will be appreciated by those of ordinary skill in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the example operating environment.

A number of program modules can be stored on the hard disk drive 270, magnetic disk 290, optical disk 292, ROM 240 or RAM 250, including an operating system 295, one or more application programs 296, other program modules 297, and program data 298. For simplicity, only the hard disk drive 270 is shown as having the operating system 295, the one or more application programs 296, the other program modules 297, and the program data 298 stored thereon.

A user can enter commands and information into the computer 200 through input devices such as a keyboard 201 and/or a pointing device 202. Other input devices (not shown) may include a microphone, joystick, game pad, satellite disk, scanner or the like. These and other input devices are often connected to the processing unit 210 through a serial port interface 206 that is coupled to the system bus 230, but may be connected by other interfaces such as a parallel port, game port, or a universal bus (USB). Further still, these devices may be coupled directly to the system bus 230 via an appropriate interface (not shown).

A monitor 207 or other type of display device is also connected to the system bus 230 via an interface, such as a video adapter 108. In addition to the monitor 207, personal computers typically include other peripheral output devices (not shown), such as speakers and printers.

The computer 200 can operate in a networking environment using logical connections to one or more remote computers, such as a remote computer 209. The remote computer 209 can be a server, a router, a network PC, a peer device or other common network node, and typically includes many or all of the elements described above relative to the computer 200, although only a memory storage device 211 has been illustrated in FIG. 2. The memory storage device 211 includes application programs 296 that provide at least a user interface for the remote computer 209. The logical connections depicted in FIG. 2 include a local area network (LAN) 212 and a wide area network (WAN) 213. Such networking environments are commonplace in offices, enterprise-wide computer networks, intranets and the Internet.

When used in a LAN networked environment, the computer 200 is connected to the LAN 212 through a network interface or adapter 214. When used in the WAN 213 networking environment, the computer 200 typically includes a modem 215 or other means of communicating over the wide area network 213, such as the Internet. The modem 215, which may be internal or external, is connected to the system bus 230 via the serial port interface 106. In a network environment, program modules depicted relative to the computer 200, or portions thereof, may be stored in a remote memory storage device.

It will be appreciated that the network connections shown are exemplary and other techniques for establishing a communications link between computers can be used. The existence of any of the various well-known protocols such as TCP/IP, Ethernet, FTP, HTTP, and the like is presumed, and the system can be operated in a client-server configuration to permit a user to retrieve Web pages from a Web server. Any of the various conventional Web browsers can be used to display and manipulate data on the Web pages.

As should be evident to those of ordinary skill in the art, the various elements illustrated in FIG. 1, such as the computer system 104, the DCOA server 110, the secure server 112, the image server 116, the order server 118, the DCOA generating server 120, or the DCOA distribution server 122, may include some or even all of the elements illustrated in FIG. 2.

FIGS. 3-6 illustrate an exemplary method for providing DCOAs in a secure manner. The exemplary method illustrated in FIGS. 3-6 will make reference to the various elements illustrated in FIG. 1, in particular, the various elements of the entity side 100 and the various elements of the provider side 102.

Figure 3:
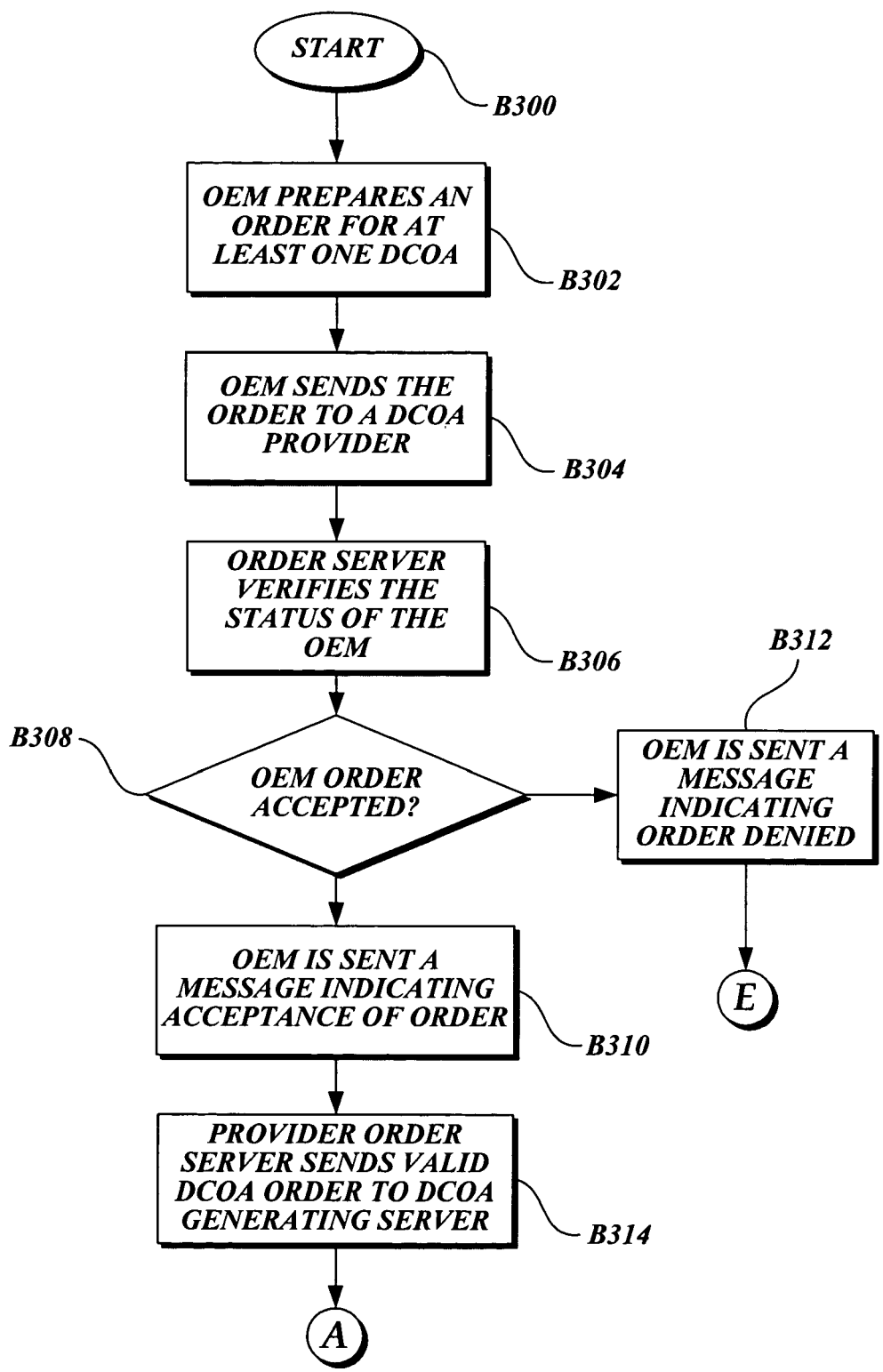
FIGS. 3-6 illustrate an exemplary method according to the present invention for providing digital certificates of authenticity (DCOAs) in a secure manner.

Referring now to FIG. 3, block B300 indicates the beginning of an exemplary method of distributing DCOAs in a secure manner. First, on the entity side 100, which may be an original equipment manufacturer (OEM), a distributor, an authorized replicator, or a third-party installer (all denoted an OEM for brevity), prepares the order 106 for at least one DCOA using the computer system 104. The entity side 100 sends the order 106 that identifies the desired number of DCOAs to the provider side 102, where the order is received by a DCOA provider, such as a manufacturer of software products that require authentication with valid DCOAs, or an authorized distributor of secured DCOAs (B304). The order 106 is preferably communicated to the provider side 102 by way of the network 108.

After the order 106 is received by the provider side 102, the order server 118 verifies the status of the OEM (B306). This verification may include determining whether the credit of the OEM is valid/good, whether the OEM is authorized to request the specific type of DCOAs specified in the order 106 (license check), or whether the number of DCOAs specified in the order 106 greatly exceeds prior orders from the OEM (unusual course of performance). If the verification process conducted in block 306 is successful (B308), the OEM is sent a message indicating that the DCOAs requested in the order 106 will be processed (B310). However, if the validation process conducted in block B306 fails, the OEM is sent a message indicating that the order 106 is denied (B312). Both the acceptance message of block B310 and the denial message of block B312 will be processed by the order server 118 of the provider side 102. The denial message may include an explanation as to why the order 106 was denied.

Figure 4:
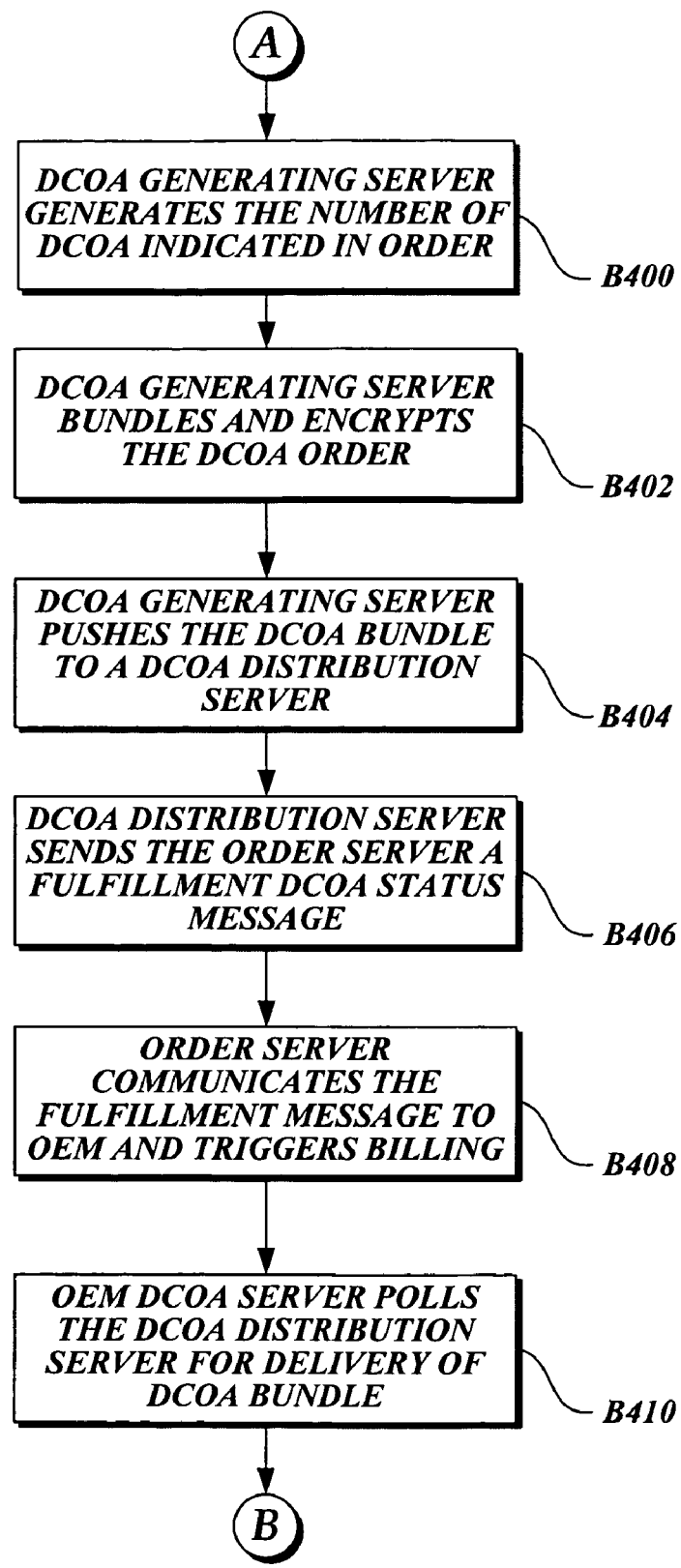

After the order 106 from the OEM, i.e., entity side 100, is accepted by DCOA provider, i.e., by the provider side 102, the order server 118 sends the specifics of the order 106 to the DCOA generating server 120 (B314). Referring now to FIG. 4, per the specifics of the order 106, the DCOA generating server 120 generates a number of DCOAs (B400). Once the number of DCOAs indicated in the order 106 are generated, the DCOA generating server 120 bundles the DCOAs as a group and encrypts each of the DCOAs in the bundle using the DCOA generating server 120 public key (B402). The DCOA generating server 120 then pushes the DCOA bundle to the DCOA distribution server 122 of the provider side 102 (B404). After receiving the DCOA bundle at the DCOA distribution server 122, the distribution server 122 sends the order server 118 a message indicating fulfillment of the requested number of DCOAs originally set forth in the order 106 (B406). The order server 118 communicates the fulfillment message to the OEM, via the network 108, and triggers a conventional billing process that allows the provider side 102 to bill the OEM (B408). The billing process may also occur after each DCOA in the DCOA bundle is used by the OEM (discussed later herein). After the OEM receives the message indicating fulfillment of order for the requested DCOAs, the DCOA server 110 polls the DCOA distribution server 122 for delivery of the DCOA bundle (D410).

Figure 5:
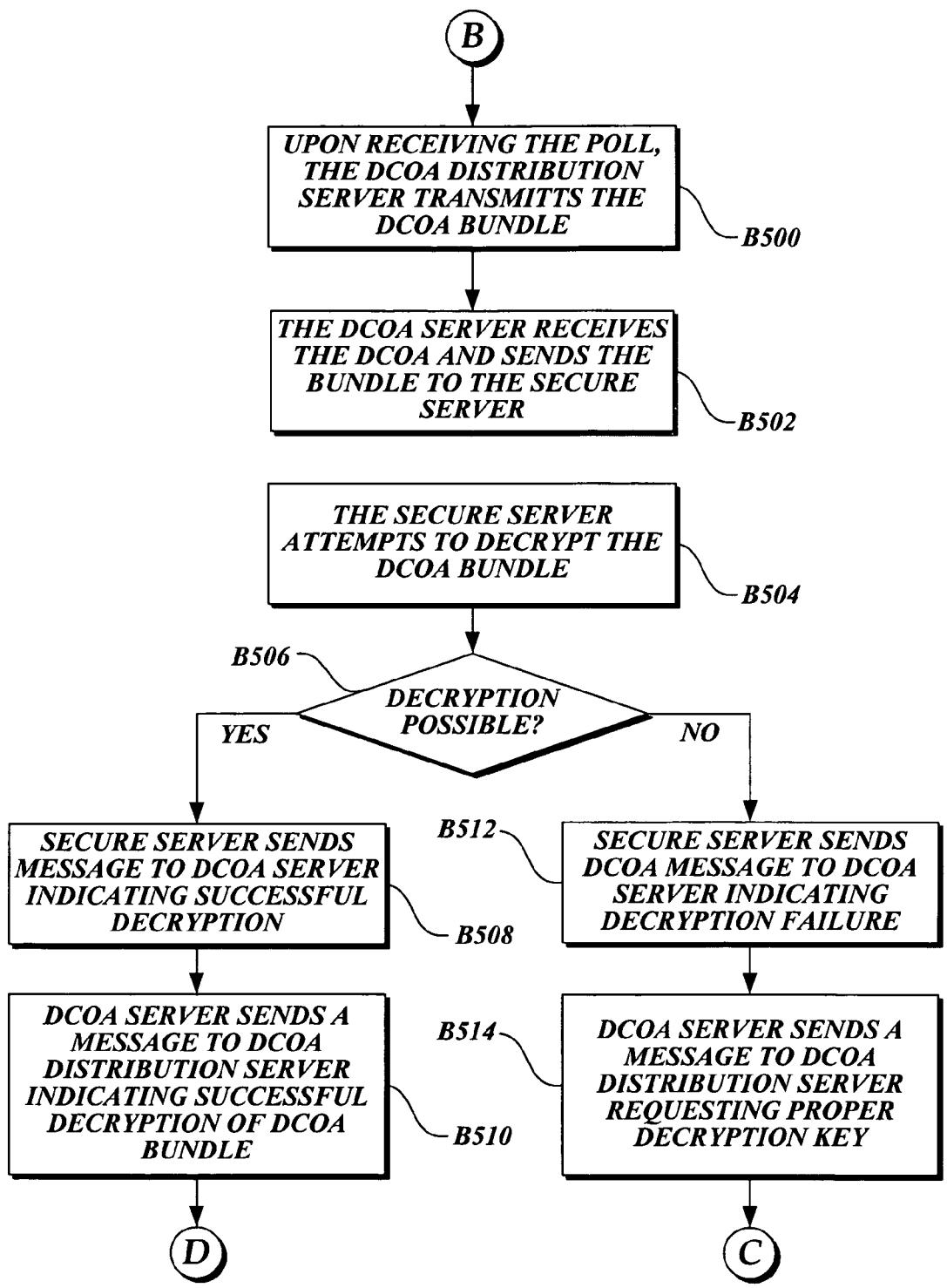

Referring now to FIG. 5, upon receiving the poll from the DCOA server 110, the DCOA distribution server 122 transmits the DCOA bundle to the DCOA server 110 via the network 108 (B500). At this point, the DCOA server 110 sends the DCOA bundle to the secure server 112 (B502). As was indicated heretofore, in this example, the secure server 112 includes the private key that is associated with the public key used by the DCOA generating server 120 to encrypt the bundled DCOAs sent to the DCOA server 110. Therefore, after the secure server 112 receives the bundled DCOAs from the DCOA server 110, the secure server 112 attempts to decrypt the DCOA bundle (B504). If decryption is possible (B506), that is, the private key is properly associated with the public key used to encrypt the DCOAs contained within the DCOA bundle, the secure server 112 sends a message to the DCOA server 110 that indicates that the DCOA bundle has been properly decrypted (B508). Subsequently, the DCOA server 110 sends a message to the DCOA distribution server 120 that indicates that the secure server 112 successfully decrypted the DCOA bundle (B510).

On the other hand, if decryption is not possible (B506), the secure server 112 send a DCOA message to the DCOA server 110 indicating decryption of the DCOA bundle failed (B512). The DCOA server 110 then sends a message to the DCOA distribution server 122 that requests a proper decryption key for the DCOAs contained within the DCOA bundle (B514). Once again, the message sent from the DCOA server 110 to the DCOA distribution server 122 is communicated via the network 108.

Figure 6:
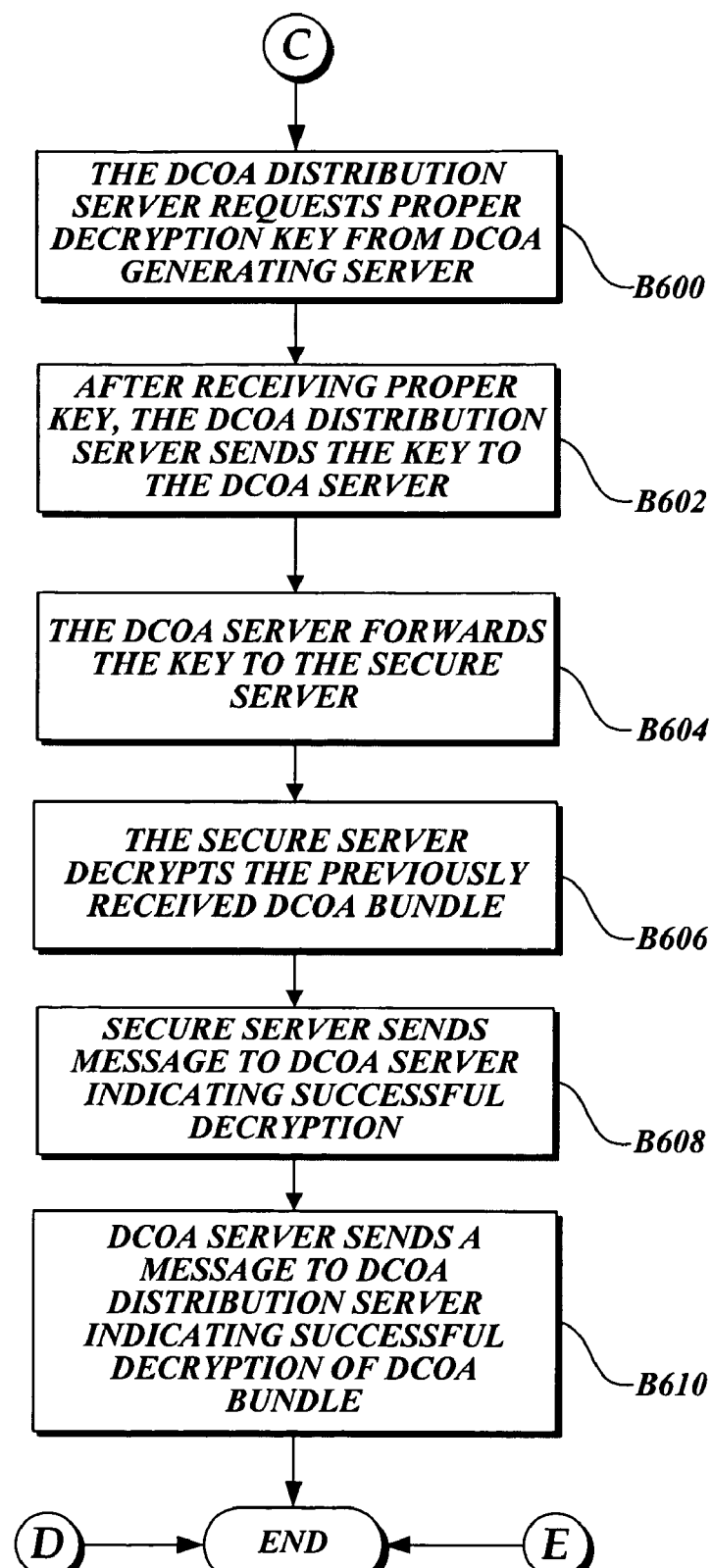

FIG. 6 is a continuation of FIG. 5, in particular a continuation of the process blocks that occur when decryption of the DCOA bundle is not possible (B506). After receiving a message from the DCOA server 110 that decryption was not possible, the DCOA distribution server 120 of the provider side 102 makes a request for a proper decryption key from the DCOA generating server 120 (B600). The request for a proper decryption key includes the specifics of the DCOA bundle that was not properly decrypted by the secure server 112. In response to the request made by the DCOA distribution server 122, the DCOA generating server 120 produces a proper decryption key and the DCOA distribution server 122 forwards the proper decryption key to the DCOA server 110 (B602). The DCOA server 110 then forwards the new decryption key to the secure server 112. The secure server 112 uses the new decryption key received from the DCOA server 110 to decrypt the DCOA bundle that requires the proper decryption key (B606). The secure server 112 then sends a message to the DCOA server 110 that indicates that the DCOA bundle was successfully decrypted (B608). The DCOA server 110 sends a message to the DCOA distribution server 122 that indicates successful decryption of the DCOA bundle (B610). Block B612 generally indicates the termination of the DCOA procurement process illustrated in FIGS. 3-6.

Although not illustrated in the FIGURES, after the provider side 102 receives a message from the entity side 100 that a given DCOA bundle has been properly decrypted, the provider side 102 may make various recording and accounting modifications to the records associated with the entity side 100 in order to reflect proper delivery of a given DCOA bundle. Additional billing and/or completion of billing may also occur once the entity side 100 properly decrypts a given DCOA bundle that has been transmitted to the entity side 100 from the provider side 102. Moreover, as those of ordinary skill in the art will readily appreciate, the DCOA procurement process illustrated in FIGS. 3-6 may be repeated as additional DCOA bundles are required by the entity side 100.

Figure 7:
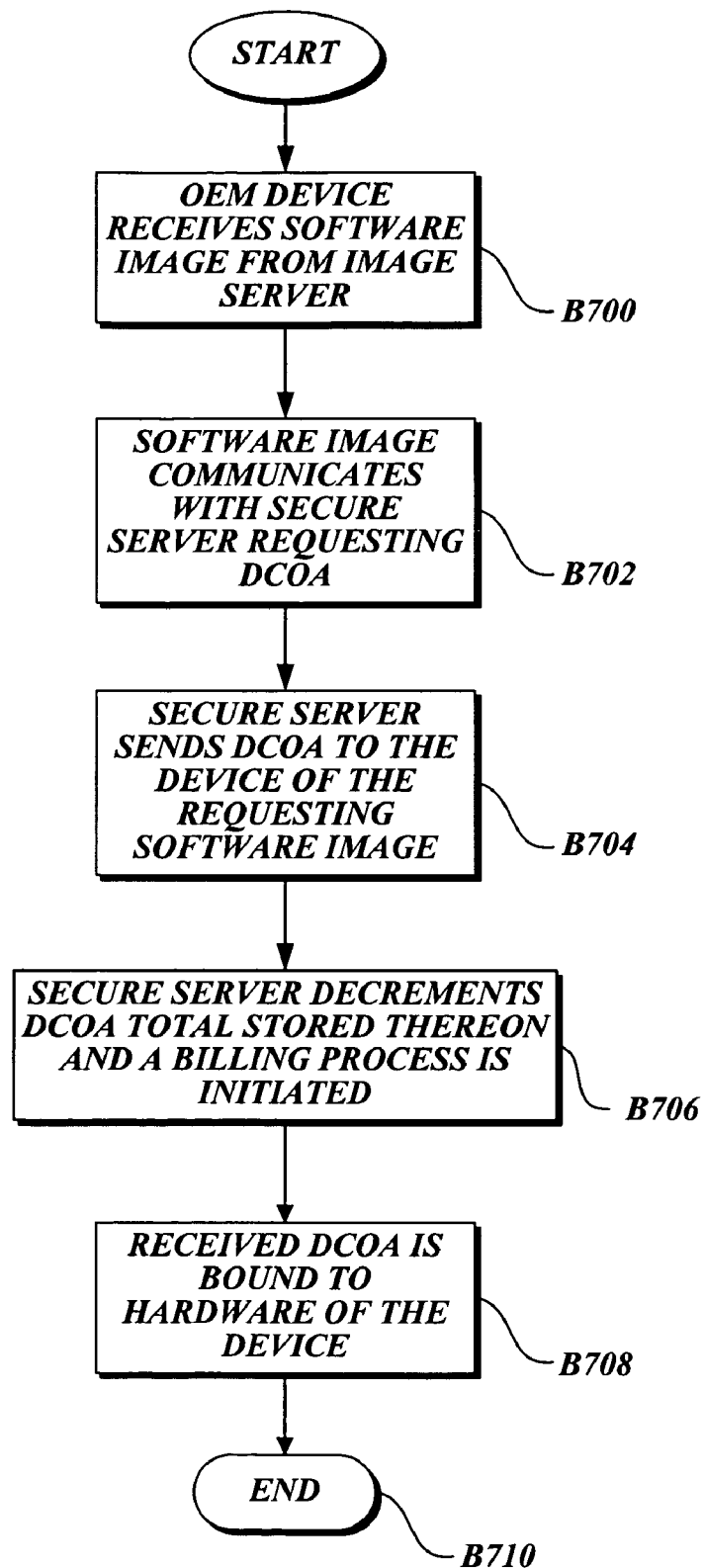
FIG. 7 illustrates a method according to an exemplary embodiment of the present invention for binding properly decrypted DCOAs to software and hardware associated with devices that use software products

FIG. 7 illustrates a method of binding properly decrypted DCOAs to software and hardware associated with devices that use software products. Block B700 marks the beginning of the process illustrated in FIG. 7. When a device is nearing production completion, such as the device 114 of the entity side 100, the device 114 will generally undergo a software preloading process. Often, an image from the image server 116 of the entity side 100 will be used to preload the device 114 with software that is required by the device 114 (B702). If the software image received from the image server 116 requires a DCOA, the software image by way of the device 114 will request a proper DCOA from the secure server 112 (B704). The secure server 112 sends the requested DCOA to the device 114 that includes the requesting software image received from the image server 116 (B706). Once the DCOA is transmitted from the secure server 112, the secure server 112 decrements the total number of DCOAs stored thereon (B708). The device 114 that receives the DCOA from the secure server 112 binds the DCOA to the hardware of the device 114 and activates the software meant for use on the device 114

A conventional billing process may be performed after the secure server 112 uses a DCOA (shown in B706). In particular, the secure server 122 reports the use of a DCOA to the provider side 102 via the DCOA server 110. The provider side 102 then will then directly bill the entity side 100, or record the use of the DCOA for billing later, after a predetermined number of DCOAs is used by the entity side 100. Billing of the entity side 100 may be consummated by the order server 118, or another device associated with the provider side 102.

Binding the DCOA normally requires obtaining an alphanumeric ID that is associated with an integral part of the deice 114 and associating the ID with the received DCOA. In the case of a computer system, the serial number of the motherboard may be used as the alphanumeric ID. Therefore, software that is authenticated with the DCOA will operate only if it is resides on the device that includes the associated alphanumeric ID. In other words, the DCOA authenticates and allows use of the preloaded software only on a device the software was originally loaded on. An ID may be obtained from any hardware element of a device. Moreover, permanent software of a device, such as software stored in ROM, may contain IDs or other information that can be used to bind the DCOA and software to a particular device.

Although not illustrated, the DCOA server 110 may also send a message to the provider side 102 indicating that a received DCOA was properly bound to the hardware device 114. Specifics of the hardware device 114 and the DCOA used with the software image may also be sent to the provider side 102 for reasons related to accounting, records, and the like.

Block B710 generally illustrates the termination of the DCOA binding process illustrated in FIG. 7. From time to time, DCOAs that are properly bound to devices manufactured or otherwise produced by an entity side may become inoperative or otherwise destroyed in the course of a manufacturing cycle. The concerned entity side may request a replacement DCOA, or a refund, through an order computer system, such as the computer system 104 illustrated in FIG. 1. After the request is received by the provider side, records and/or accounting associated with the requesting entity side may be reviewed by the provider of the DCOA that was installed on the device that is either inoperative or destroyed. If the request is valid, the provider may issue a replacement DCOA, or allow a refund if such a request was made.

While the presently preferred embodiments of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A computer-implemented method, for distributing software product keys electronically to allow automatic authentication of pre-installed software programs, comprising:
   verifying an originator of an order requesting a digital certificate of authorization is authorized to receive digital certificates of authentication, wherein verification includes determining if the originator has valid credit and if the size of the request is consistent with previously received orders from the originator and wherein the originator is a manufacturer of hardware devices; and
   providing a digital certificate of authentication to an authorized order originator, the digital certificate of authentication for authenticating software programs previously installed on a remote computing device originating the order for the digital certificate of authorization and that is necessary to enable the pre-installed software programs, wherein authenticating includes associating the digital certificate with an attribute of the device that includes the software program that has been pre-installed on the remote computing device.

2. The method according to claim 1, wherein the attribute includes an alphanumeric value associated with hardware of the device.

3. The method according to claim 2, wherein the hardware is a motherboard of the device.

4. The method according to claim 3, wherein the alphanumeric value is a serial number associated with the motherboard of the device.

5. The method according to claim 1, further comprising encrypting the digital certificate of authentication with an encryption key, wherein decrypting the encrypted digital certificate of authentication requires the use of a complementary decryption key associated with a key used to encrypt the digital certificate of authentication.

6. The method according to claim 5, wherein the key used to encrypt the digital certificate of authentication is a public key that requires an associated private key to complete a decryption process.

7. The method according to claim 1, wherein the digital certificate of authentication is a plurality of digital certificates of authentication.

8. The method according to claim 7, further comprising bundling the plurality of digital certificates of authentication for communication over a network medium from a digital certificates of authentication distribution server to a remote secure server, and encrypting each of the digital certificates of authentication in the bundle.

9. The method according claim 1, further comprising receiving an order for the digital certificate of authentication, and verifying an originator of the order for the digital certificate of authentication is authorized to receive digital certificates of authentication before providing the digital certificate of authentication.

10. A computer-implemented method for distributing software product keys electronically to hardware manufacturing entities, comprising:
    receiving at a provider side an order requesting a digital certificate of authentication for software already installed on a computing device originating the order for the digital certificate of authorization, wherein a provider is a software manufacturer;
    verifying an originator of the order for the digital certificate of authorization is authorized to receive digital certificates of authentication from the provider, wherein verification includes determining if the originator has valid credit and if the size of the request is consistent with previously received orders from the originator and wherein the originator is a manufacturer of hardware devices;
    generating a digital certificate of authentication that can enable the previously installed software, the digital certificate of authentication being encrypted on the provider side with an encryption key; and
    preparing the encrypted digital certificate of authentication for transmission over a transmission medium.

11. The method according to claim 10, wherein the received order includes a request for a plurality of digital certificates of authentication, the generating step generates the requested plurality of digital certificates each digital certificate being encrypted with an encryption key, and the preparing step bundles the encrypted digital certificates for transmission over the transmission medium.

12. The method according to claim 11, wherein the transmission medium is the Internet.

13. The method according to claim 11, wherein the encryption key is a public key that includes a complementary private key that may be used to decrypt the encrypted digital certificates.

14. The method according to claim 11, wherein the encryption key is a public key that includes a complementary private key that may be used to decrypt the encrypted digital certificates.

15. The method according to claim 10, wherein the hardware of the device is a motherboard of the device.

16. A system for distributing software product keys electronically to manufacturing entities, comprising:
    a provider side, wherein a provider is a software manufacturer, the provider side having an order receiving device for receiving orders requesting one or more digital certificates of authentication;

a verification device on the provider side, the verification device for determining if an originator of the received orders is authorized to receive digital certificates of authentication, wherein verification includes determining if the originator has valid credit and if the size of the request is consistent with previously received orders from the originator;

a digital certificate of authentication generating device on the provider side, the generating device for generating digital certificates of authentication, wherein generated digital certificates of authentication are encrypted with an encryption key and bundled in a manner that allows communication thereof over a transmission medium;

an entity side, wherein an entity manufactures hardware devices, the entity side comprising:

a digital certificate of authentication receiving server for receiving one or more digital certificates of authentication;

an image server having software programs stored thereon; and a device having on or more of the software programs preloaded thereon from the image server, wherein the previously loaded software programs are activated by a digital certificate of authentication and the device originates the order for the digital certificate of authorization.

17. The system according to claim 16, wherein the device on the entity side is loaded with software programs from the image server.

18. The system according to claim 17, wherein the device on the entity side requires the authentication of the loaded software programs using one or more digital certificates of authentication.

19. The system according to claim 16, wherein the secure server on the entity side uses a private key associated with a public for securing the digital certificates of authentication delivered from the provider side to decrypt the secured digital certificates of authentication.

20. The system according to claim 16, wherein the transmission medium is the Internet.

* * * * *